(12) United States Patent
Stapelfeld et al.

(10) Patent No.: US 6,825,768 B2
(45) Date of Patent: Nov. 30, 2004

(54) ADAPTIVE PET CONTAINMENT SYSTEM AND METHOD

(75) Inventors: Norval Stapelfeld, Manchester, NH (US); Frederic Peterson, Chelmsford, MA (US)

(73) Assignee: Dogwatch, Inc., Natick, MA (US)

(*) Notice: Subject to any disclaimer, the term of this patent is extended or adjusted under 35 U.S.C. 154(b) by 0 days.

(21) Appl. No.: 10/170,220

(22) Filed: Jun. 12, 2002

(65) Prior Publication Data

US 2003/0034893 A1 Feb. 20, 2003

Related U.S. Application Data

(60) Provisional application No. 60/298,278, filed on Jun. 14, 2001.

(51) Int. Cl.[7] .............................................. G08B 23/00
(52) U.S. Cl. ............................... 340/573.3; 340/407.1; 340/564; 340/565; 340/573.1; 119/421; 119/712; 119/714; 119/719; 119/721; 119/908
(58) Field of Search ........................ 340/573.3, 407.1, 340/573.1, 551, 552, 564, 565, 825.19, 825.46, 567, 10.5; 119/721, 718, 719, 720, 908, 714, 712, 421; 607/58

(56) References Cited

U.S. PATENT DOCUMENTS

| | | | | |
|---|---|---|---|---|
| 5,067,441 A | * | 11/1991 | Weinstein | 119/721 |
| 5,207,179 A | * | 5/1993 | Arthur et al. | 119/721 |
| 5,559,498 A | * | 9/1996 | Westrick et al. | 340/573.3 |
| 5,787,841 A | * | 8/1998 | Titus et al. | 119/721 |
| 5,815,077 A | * | 9/1998 | Christiansen | 340/573.3 |
| 5,852,403 A | * | 12/1998 | Boardman | 340/573.1 |
| 6,215,399 B1 | * | 4/2001 | Shpater | 340/567 |
| 6,431,122 B1 | * | 8/2002 | Westrick et al. | 340/573.3 |

* cited by examiner

Primary Examiner—Davetta W. Goins
(74) Attorney, Agent, or Firm—Weingarten, Schurgin, Gagnebin & Lebovici LLP

(57) ABSTRACT

The present invention provides an automatic correction system and technique for a pet containment system in which the correction levels of the electrical stimulus and/or audio or visual warning are adaptively adjusted in accordance with the behavior of a particular dog or other animal. In one mode of operation, the system is set to a baseline correction level at which a predetermined warning such as an audible beep is provided when the animal enters a first detection zone, and a predetermined electrical stimulus is provided when the animal enters a second detection zone. The correction levels are automatically adjusted in response to one or more parameters of the animal's behavior. One example of animal behavior to be corrected is repeated challenge by the animal to the system by repeated entry into the first or second detection zone within a defined period of time. Another example of behavior to be corrected is the animal remaining in a detection zone beyond a specified time period. Yet another example is the animal escaping from the defined perimeter. The system can automatically adjust the warning, the electrical stimulus or both. The auto-correction system is embodied as part of the receiver which is typically worn by the animal on a collar. The parameters of the auto-correction program can be set by control data transmitted to the receiver by the system transmitter. According to another aspect of the invention, data can be downloaded from the receiver for providing status and performance information. The receiver can be interrogated via a remote control device for example, to obtain the status data. A display or indicator can be provided at the receiver or can be associated with the receiver for display of system status.

22 Claims, 5 Drawing Sheets

ADAPTIVE PET CONTAINMENT SYSTEM AND METHOD

CROSS REFERENCE TO RELATED APPLICATIONS

This application claims priority under 35 U.S.C. §119(e) to Provisional Patent Application Ser. No. 60/298,278 filed on Jun. 14, 2001; the disclosure of which is hereby incorporated by reference.

STATEMENT REGARDING FEDERALLY SPONSORED RESEARCH OR DEVELOPMENT

N/A

BACKGROUND OF THE INVENTION

Pet containment systems are known for maintaining a dog or other animal within a defined area or to keep the animal outside of a defined area. Such a system includes a buried antenna wire which defines a perimeter or boundary across which the dog or other pet is trained to not cross. One well known system is the Hidden Fence System of DogWatch Inc. A transmitter is connected to the buried antenna and which drives the antenna to radiate an electromagnetic field which is detectable by a receiver attached to an animal collar. The intensity of the transmission or sensitivity of the receiver are adjusted to provide detection of the antenna field at predetermined distances from the antenna. Typically in a first zone of detection, the receiver senses a relatively weaker antenna field and provides an audible warning to the animal. At a second detection zone which is closer to the antenna, the receiver senses a stronger antenna field and causes an electrical stimulus to be applied to the animal as an indication to the animal that it is too close to the perimeter. By appropriate training the animal learns to stay away from the perimeter so as not to receive an electrical stimulus or audible warning. The intensity of the audible warning and intensity of the electrical stimulus are set by an installer or in some cases by a user to accommodate the behavior of a particular animal. Adjustment of the correction levels often requires a visit by a system installer. It would be useful to have a system in which the correction levels could be automatically adjusted without need for a service call and without need for user intervention.

BRIEF SUMMARY OF THE INVENTION

In brief, the present invention provides an automatic correction system and technique for a pet containment system in which the correction levels of the electrical stimulus and/or audio or visual warning are adaptively adjusted in accordance with the behavior of a particular dog or other animal. In one mode of operation, the system is set to a baseline correction level at which a predetermined warning such as an audible beep is provided when the animal enters a first detection zone, and a predetermined electrical stimulus is provided when the animal enters a second detection zone. The correction levels are automatically adjusted in response to one or more parameters of the animal's behavior. One example of animal behavior to be corrected is repeated challenge by the animal to the system by repeated entry into the first or second detection zone within a defined period of time. Another example of behavior to be corrected is the animal remaining in a detection zone beyond a specified time period. Yet another example is the animal escaping from the defined perimeter. The system can automatically adjust the warning, the electrical stimulus or both.

For an audible warning, any one or more changes in the audible sound can be provided, for example, the amplitude of the warning sound can be adjusted, and/or the rate or pitch of the sound can be adjusted. The audible warning can be a beep or a tone or a voice command. The voice command can be provided by a voice synthesizer or the vocalization can be in the voice of the pet owner. For a visual warning, the intensity, rate or color of the visual indication can be changed. The changes can also be with respect to an individual parameter or combination of parameters. The electrical stimulus can be changed with respect to the intensity of the stimulus and/or the rate at which the stimulus is applied. In principle, the auto-correction system can provide N levels of adjustment and M rates of adjustment in various combinations. A base level is specified for the warning and for the electrical stimulus, and the maximum level for each is also specified. The system is operative to control and automatically or adaptively adjust any one or more of the adjustable parameters to suit the particular behavioral characteristics of the animal.

The system can revert to a level appropriate to the animal's behavior. For example, the base level may be adjusted to a new base level in response to the animal behavior, and the level can be raised from the new base level when appropriate. After a period of time at the raised level, the level can revert to the lower new base level. One or more auto-correction programs can be stored and selected by the system owner. The program can be changed by a user without dealer or service technician intervention. The auto-correction mode can be enabled or disabled by the user. In the disabled mode, the system functions with predetermined parameters and without the adaptive correction.

The auto-correction system is embodied as part of the receiver which is typically worn by the animal on a collar. The parameters of the auto-correction program can be set by control data transmitted to the receiver by the system transmitter or by a separate transmitter.

According to another aspect of the invention, data can be downloaded from the receiver for providing status and performance information. The receiver can be interrogated via a remote control device for example, to obtain the status data. A display or indicator can be provided at or associated with the receiver or collar. Alternatively, the display or indicator can be on a remote device which is in wireless or wired communication with the receiver. For example, a display or indication of the present level and rate of the warning and electrical stimulus can be provided. The status of the battery can also be provided. The indication can be by sound, speech annunciation, display screen or other indicator. The indication of warning and electrical stimulus levels or rates and other status information can be denoted by LEDs, or can be displayed on a screen such as a screen of a palm type data device, PDA or the like. The current system status can be immediately displayed or stored for later display or use and the history of system operation can be displayed and/or stored.

BRIEF DESCRIPTION OF THE SEVERAL VIEWS OF THE DRAWING

The invention will be further described in the following detailed description, in conjunction with the drawings in which.

DETAILED DESCRIPTION OF THE INVENTION

Figure 1:
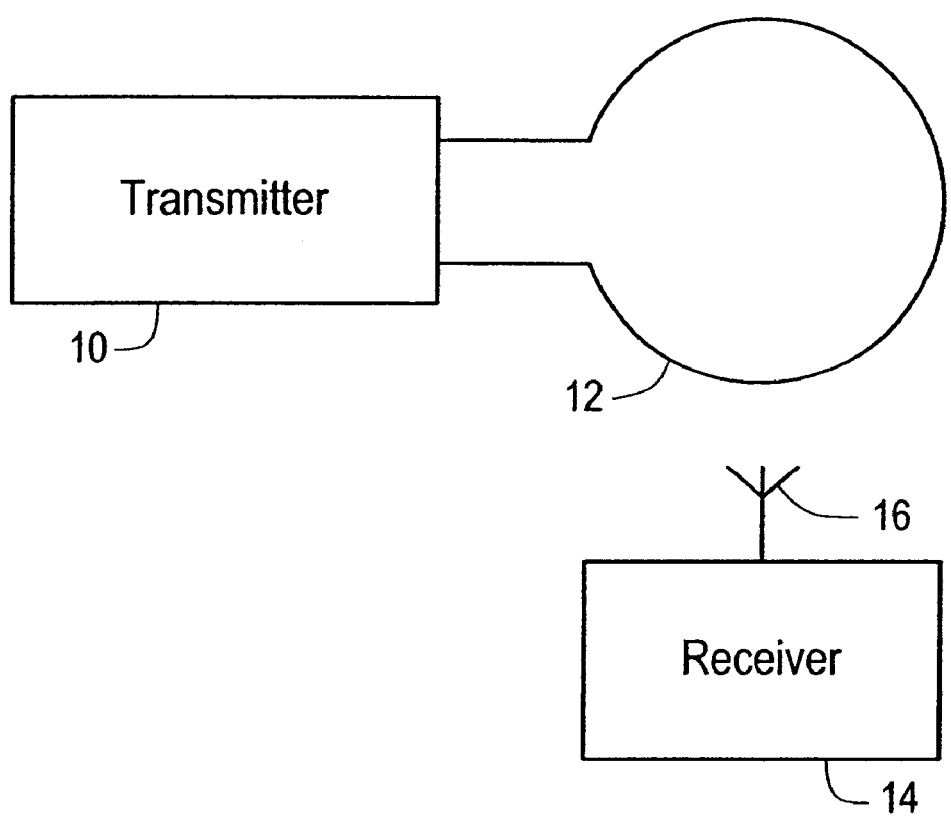
FIG. 1 is a diagrammatic view of a pet containment system in which the invention is employed.

A pet containment system in which the adaptive correction system and technique of the invention are employed is shown in FIG. 1 and includes a transmitter 10 coupled to a loop antenna 12 which is buried around the perimeter of a yard or other site in which a dog or other animal is to be contained. A receiver 14 having an antenna 16 is enclosed within a small waterproof housing affixed to a collar worn by the animal. The receiver is operative to detect radiation from the antenna and depending on the proximity of the receiver from the antenna, the receiver will provide a warning signal or a stimulus signal to the animal. The system can preferably be as shown in U.S. Pat. No. 6,360,698 of the Assignee of this invention.

The auto-correction system provides the lowest permissible level of correction suitable to the conduct of the animal. The receiver is programmed to an initial level via a control device. Preferably as shown in U.S. Pat. No. 6,079,367 of the Assignee of this invention, the programming device is in the form of a magnet wand which provides the ability to program the correction level to several different steps or intensities. The transmitter can also be initially adjusted to a specified rate and the shock mode can be switched on or off. Over a period of time the receiver auto-correction system will adaptively determine the lowest correction level that will effectively contain the animal by monitoring the animal behavior and adaptively adjusting the correction level. The optimum correction level for the animal is determined by a set of heuristics programmed in the receiver microcontroller firmware. Various heuristic correction protocols or programs may be defined that take into account, for example, the present correction level, the previous correction level, the time elapsed since the last challenge and the number of times the animal approaches or challenges the boundary in a given time period.

Figure 2:
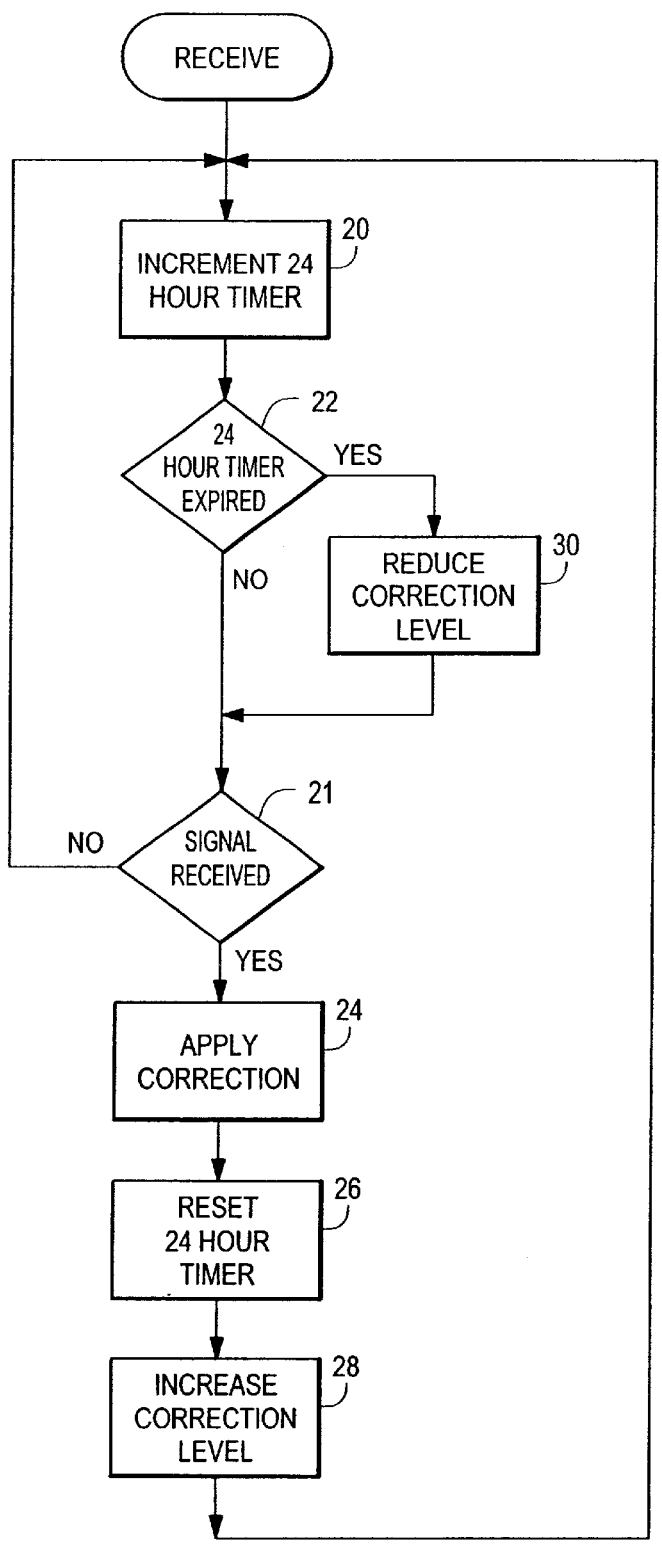
FIG. 2 is a flow chart of the auto-correction process in accordance with the invention.

The auto-correction process is shown in the flowchart of FIG. 2. A time period is established by a timer, which counts down from the last received signal (block 20 and 22). In the illustrated embodiment, the time period is 24 hours. As denoted by decision block 21 if the signal was received within the timer period, the correction is made (block 24) and the timer is reset (block 26). The correction is in the form of a increased correction level to the warning signal, the stimulus signal or both (block 28). If the 24 hour time period has expired, the correction level is reduced (block 30) according to the stored auto-correction program, thereby to establish a new base level.

Figure 3A:
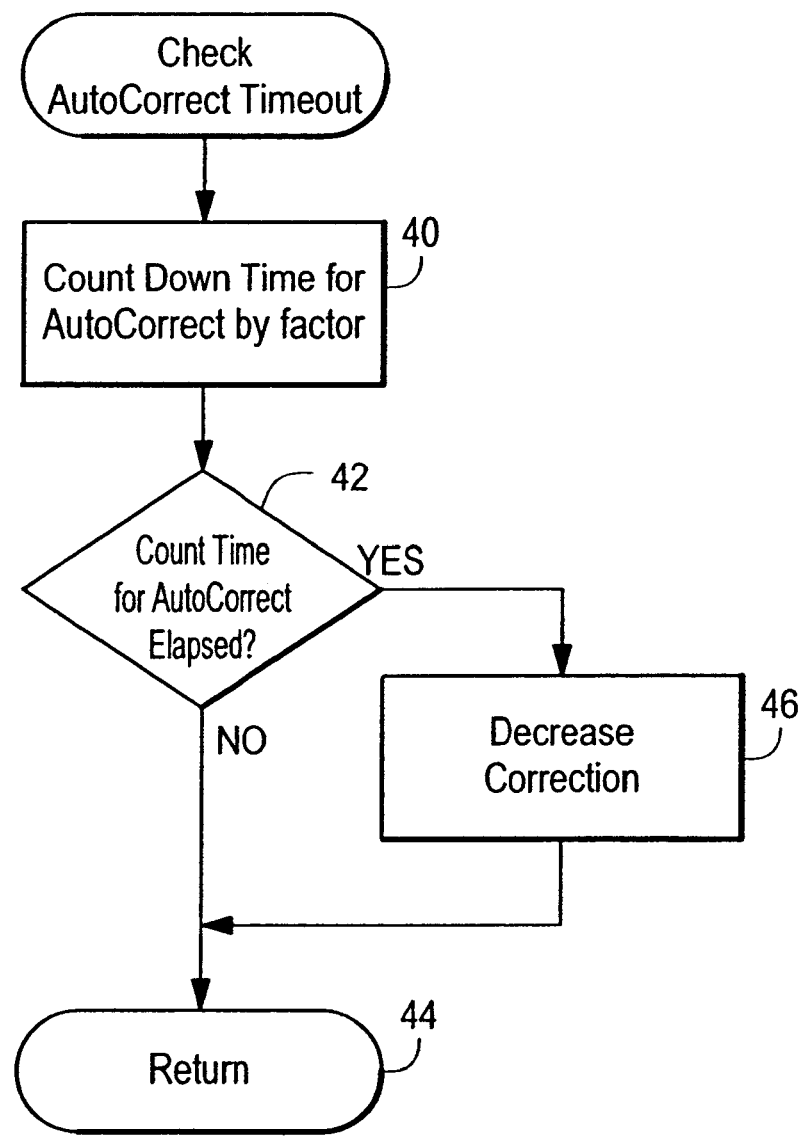
FIGS. 3A and 3B are flowcharts further illustrating the auto-correction processing.
Figure 3B:
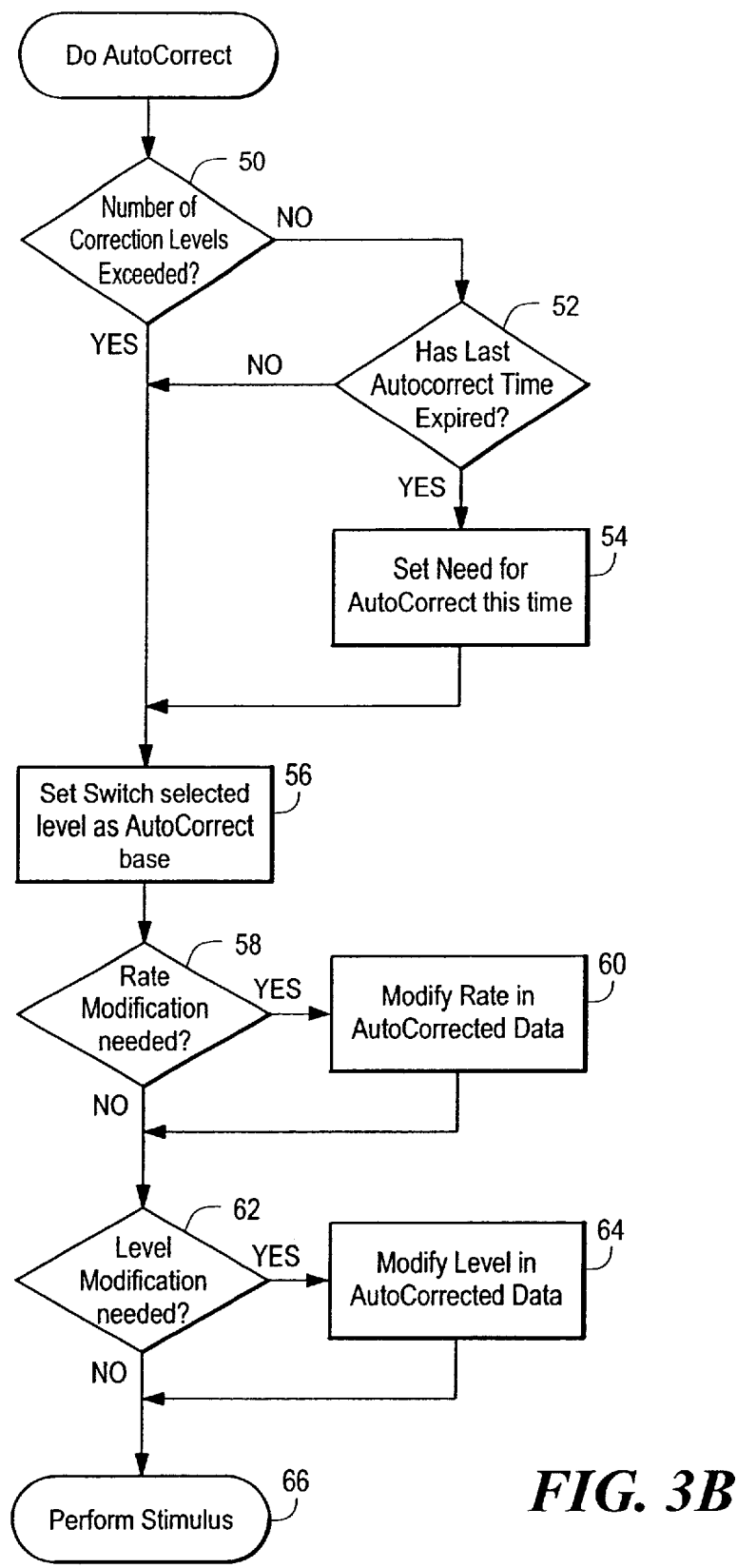

More detailed flowcharts of the auto-correction process are shown in FIGS. 3A and 3B. Referring to FIG. 3A, the timer counts down by a predetermined factor and the countdown is monitored to determine if the specified time period has elapsed (block 40). The countdown factor in the illustrated embodiment is the average sleep interval of the receiver which is a presently preferred embodiment is 238 msec. If the time period has not elapsed (42), the system continues to monitor the countdown (44). If the time period has elapsed without receipt of a receiver signal, the correction level is decreased by one correction step (46). If the correction level has been decremented to the lowest correction level, the correction level remains at the lowest level.

If a signal is received during the time period, the signal is processed to cause generation of a warning and/or stimulus to the animal, and the counting is reset. If another signal is received before the time period has elapsed, the correction level is incremented to the next higher level to provide increased warning and/or stimulus to the animal. The processing is illustrated in FIG. 3B. Referring to FIG. 3B, the system determines whether the number of correction levels has been exceeded (50). If so, the correction level remains at the minimum level (56). If not exceeded, a determination is made whether the last autocorrect time has expired (52). If the autocorrect time has expired the timer is reset for countdown of the specified time period (54). A determination is then made whether a rate modification is needed (58). If rate modification is needed, the rate is increased to the next correction level (60). If no rate modification is needed, a determination is made as to whether level modification is needed (62). If level modification is needed, the level is increased to the next correction level (64).

A short delay or buffer period can be provided between detection of a signal caused by the animal challenging the perimeter and the provision of a stimulus. The buffer period prevents the correction levels from stepping up too rapidly in the event of two or more challenges during the buffer interval. The buffer period is provided by a timer and the system can be operative to provide a single correction step at the end of the buffer period irrespective of the number of detections received during the buffer period.

The microprocessor is programmed to perform the auto-correct processing based on a correction protocol which has been specified and stored in the microprocessor memory. The processing to determine whether auto-correction is needed and what correction is to be made occurs during the sleep interval. The warning and/or stimulus is provided based on the most recent correction data.

One or more correction protocols can be provided which can be selected by a user in accordance with particular animal behavior.

In use, the animal will receive increasing levels of correction if the animal challenges the system often. The animal will receive less correction if it rarely challenges the system so that the animal will tend to be corrected at a level as low as necessary to accomplish the goal of discouraging challenge of the protection zone.

A sample correction protocol is as follows and which provides the specified step-increase progression.

If the level is zero or if the shock mode is off, jump to level 1, rate 1.

If the rate is between rate 1 and rate 2 then increase the rate by 1 from the previous rate until rate 3 is reached.

If rate 3 is reached, increase the level from the previous level until level 3 is reached.

If level 3 is reached, then jump to level 4.

If level 4 is reached, then jump to level 5.

After a single challenge, the correction will be increased by one step for a time period of 24 hours. If another challenge occurs within the 24 hour period, the correction will be increased an additional step and the 24 hour time reset. Multiple challenges within the 24 hour time period will result in a rapid increase of the correction level from the initial value to a maximum level 5 or other maximum specified level.

Figure 4:
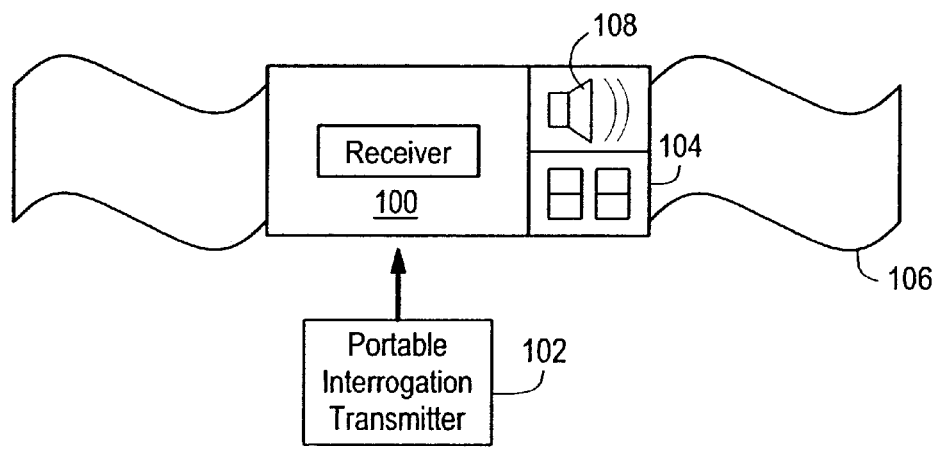
FIG. 4 is a diagrammatic representation of a display on the collar associated with the receiver.

According to another aspect of the invention, data can be downloaded from the receiver for providing status and performance information. Referring to FIG. 4, the receiver 100 can be interrogated by means of a remote transmitter 102 to provide output indications on a display device 104 on the collar 106. The display can include one or more LEDs the brightness and/or rate of illumination of which provide output indications of status. Output indications can also be audibly provided by the speaker 108 associated with the receiver. The interrogation transmitter 102 can be a small transmitter providing appropriate command signals to the receiver. Alternatively, the receiver can be interrogated by command signals from the system transmitter to provide status information. The display can typically provide an indication of the present level and rate of the warning and electrical stimulus, and can also denote the battery status.

Figure 5:
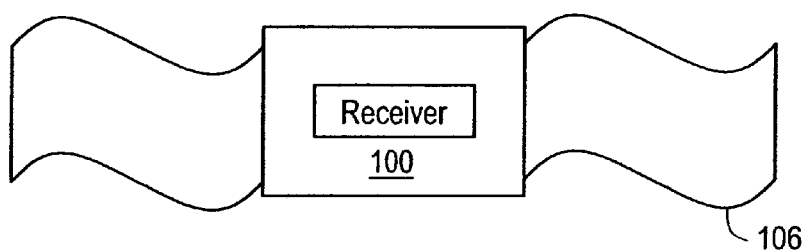
FIG. 5 is a diagrammatic representation of a display located on a remote device which is in communication with the receiver.
Figure 5:
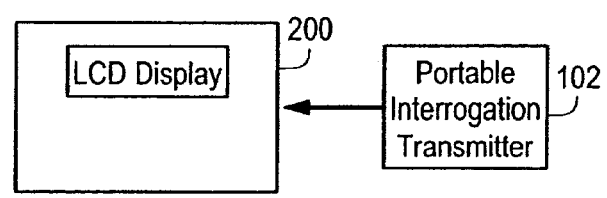

Another embodiment is shown in FIG. 5 in which a portable transceiver device 200 includes an LCD screen 202 to provide a display of status information which can include battery life, correction level and rate. The device is in communication with the receiver 100 to interrogate the receiver and to receive the requested status information. Status information may also be provided by a palm type data device which is in communication with the collar receiver either directly or via an interface.

Communication between the collar receiver and the remote device can be by many different forms of wireless communication including RF and infrared. In addition to display of current system status, data can be provided representing system history which can be displayed for immediate reading and/or stored for later display or printout.

The invention is not to be limited by the preferred embodiments described and is to embrace the full spirit and scope of the claims.

What is claimed is:

1. For use in a pet containment system having a transmitter driving an antenna which defines a boundary, and a receiver worn by the pet and operative in response to electromagnetic energy received from the antenna to provide one or more warning indications to the pet that it is too close to the boundary, an automatic adaptive correction method comprising the steps of:
   establishing a first correction level at the receiver for providing at least one stimulus of a first level;
   setting a timer in the receiver to define a predetermined time period;
   monitoring the receipt of a detection signal indicative of the conduct of the pet by the receiver;
   if a detection signal is received within the predetermined time period, increasing the first correction level and at least one stimulus by a specified amount; and
   if no detection signal is received and no stimulus is provided within the predetermined time period, decreasing the first correction level by a specified amount.

2. The method of claim 1 including the step of establishing a maximum correction level at the receiver.

3. The method of claim 1 wherein the at least one stimulus includes an audible warning.

4. The method of claim 3 wherein the audible warning includes a voice command.

5. The method of claim 1 wherein at least one stimulus includes an audible warning and an electrical stimulus.

6. The method of claim 5 wherein increasing the correction level of the audible warning comprises adjustment of one or more of the intensity, rate and pitch of the audible sound.

7. The method of claim 6 wherein increasing the correction level of the electrical stimulus comprises adjustment of the intensity of the electrical stimulus.

8. The method of claim 1 further including the step of displaying an indication of the status of current correction levels.

9. An adaptive animal containment system comprising:
   a transmitter coupled to an antenna which defines a boundary;
   a receiver adapted to be worn by an animal and operative to receive electromagnetic energy from the antenna;
   the receiver being operative in response to a predetermined proximity to the antenna to provide a warning signal or a stimulus signal to the animal;
   an automatic correction system in the receiver and including:
   memory apparatus for storing data representative of the conduct of the animal;
   a timer for defining a predetermined time period; and circuitry operative, in response to the receipt of a detection signal indicative of the conduct of the animal from the receiver within the predetermined time period, to increase a correction level by a specified amount, the circuitry being further operative, in the event no detection signal is received and no warning or stimulus signal is provided within the predetermined time period, to decrease the correction level by a specified amount.

10. The system of claim 9 including:
    a second timer for defining a buffer time period;
    the circuitry being operative to adjust the correction level by one step at the end of the buffer period in the event one or more detection signals are received during the buffer period.

11. An adaptive animal containment system comprising:
    a transmitter coupled to an antenna which defines a boundary;
    a receiver adapted to be worn by an animal and operative to receive electromagnetic energy from the antenna;
    the receiver being operative in response to a predetermined proximity to the antenna to provide a warning signal or an electrical stimulus to the animal at selected correction levels;
    an automatic correction system in the receiver and including:
    memory apparatus for storing data representative of the conduct of the animal and a protocol for providing warning signals or electrical stimuli to the animal in accordance with the stored data representative of animal conduct; and
    circuitry operative, in response to the stored data and the protocol and a detection signal indicative of the conduct of the animal received within a predetermined time period, to increase at least one of the selected correction levels by a specified amount, the circuitry being further operative, in the event no detection signal is received and no warning signal or stimulus is provided within the predetermined time period, to decrease the selected correction level by a specified amount.

12. For use in a pet containment system having a transmitter driving an antenna which defines a boundary, and a receiver worn by the pet and operative in response to electromagnetic energy received from the antenna to provide one or more warning indications to the pet that it is too close to the boundary, an automatic adaptive correction method comprising the steps of:

storing one or more correction protocols in a computer memory associated with the receiver;

establishing a base correction level at the receiver for providing at least one stimulus of a base level;

establishing a maximum correction level at the receiver for providing at least one stimulus of a maximum level;

monitoring the receipt of detection signals by the receiver indicative of the conduct of the pet, the detection signals being received within a predetermined time period;

increasing the correction level in response to the detection signals and a stored protocol and stored data representative of the conduct of the pet; and in the event no detection signals are received and no stimulus is provided within the predetermined time period, decreasing the correction level in accordance with the stored protocol.

13. The method of claim 12 wherein a plurality of correction protocols are stored and wherein each one of the plurality of correction protocols is user selectable.

14. The method of claim 12 wherein the automatic correction can be enabled and disabled by a user.

15. For use in a pet containment system having a transmitter driving an antenna which defines a boundary, and a receiver worn by the pet and operative in response to electromagnetic energy received from the antenna to provide one or more warning indications to the pet that it is too close to the boundary, an automatic adaptive correction system comprising:

a microcontroller containing at least one correction profile that includes the present correction level, the previous correction level, the time elapsed since the last pet detection signal and the number of times the pet is too close to the boundary within a predetermined time period; and circuitry in the receiver operative, in response to the detection signal and output commands from the correction profile, to increase the correction level in accordance with the correction profile, the circuitry being further operative in the event no detection signal is received and the number of times the pet is too close to the boundary is zero within the predetermined time period, to decrease the correction level in accordance with the correction profile.

16. The system of claim 15 including:

a display coupled to the receiver and operative to provide indications of system status; and a handheld device for providing interrogating signals to the receiver and receiving from the receiver signal indications of system status, the device containing a display for denoting system status.

17. The system of claim 15 including:

a display coupled to the receiver and providing indications of system status.

18. The system of claim 17 wherein the indications of system status include indication of correction levels.

19. The method of claim 1 wherein the setting step includes setting the timer in the receiver to define a predetermined time period between two successive boundary challenges by the pet, wherein the monitoring step includes monitoring the receipt of a first detection signal by the receiver, the first detection signal being indicative of a first boundary challenge by the pet, and wherein the increasing step includes, if a second detection signal indicative of a second boundary challenge by the pet is received within the predetermined time period after the first boundary challenge by the pet, increasing the correction level and at least one stimulus by a specified amount.

20. The system of claim 9 wherein the receiver is operative to receive electromagnetic energy from the antenna in the form of a detected signal indicating a challenge to said boundary, wherein the memory apparatus is operative to store data representative of the number of boundary challenges of the animal over a predetermined time period, wherein the time is operative to define said predetermined time period between two successive boundary challenges, and wherein the circuitry is operative, in response to the receipt of a detection signal from the receiver indicative of a second boundary challenge by the animal within the predetermined time period after a first boundary challenge by the animal, to adjust the correction level by a specified amount.

21. The system of claim 11 wherein the receiver is operative to receive electromagnetic energy from the antenna indicative of a boundary challenge, and wherein the memory apparatus is operative to store data representative of the number of boundary challenges by the animal over a predetermined period of time, and a protocol for providing warning signals or electrical stimuli to the animal in accordance with the stored data.

22. The method of claim 12 wherein the monitoring step includes monitoring the receipt of detection signals the receiver, the detection signals being representative of the pet challenging the boundary by being too close to the boundary, and wherein the adjusting step includes adjusting the correction level in response to a stored protocol and stored data representative of the number of boundary challenges by the animal over a predetermined period of time.

* * * * *

UNITED STATES PATENT AND TRADEMARK OFFICE
CERTIFICATE OF CORRECTION

PATENT NO. : 6,825,768 B2
DATED : November 30, 2004
INVENTOR(S) : Norval Stapelfeld et al.

It is certified that error appears in the above-identified patent and that said Letters Patent is hereby corrected as shown below:

Title page,
Item [57], ABSTRACT, please delete the entire Abstract and insert as follows:
-- An automatic correction system and technique for a pet containment system, in which correction levels of an electrical stimulus and/or an audio or visual warning are adaptively adjusted according to the behavior of the pet. In one mode of operation, the system is set to a baseline correction level, at which a predetermined warning is provided when the pet enters a first detection zone, and a predetermined electrical stimulus is provided when the pet enters a second detection zone. The correction levels of the warning, the electrical stimulus, or both, are automatically adjusted in response to one or more parameters of the pet's behavior. --.

Signed and Sealed this

Eighteenth Day of October, 2005

JON W. DUDAS
*Director of the United States Patent and Trademark Office*